Jan. 1, 1924.
H. J. MUNSTER
1,479,311
SWITCH FOR MOTION PICTURE PROJECTORS
Filed Nov. 4, 1920 2 Sheets-Sheet 1
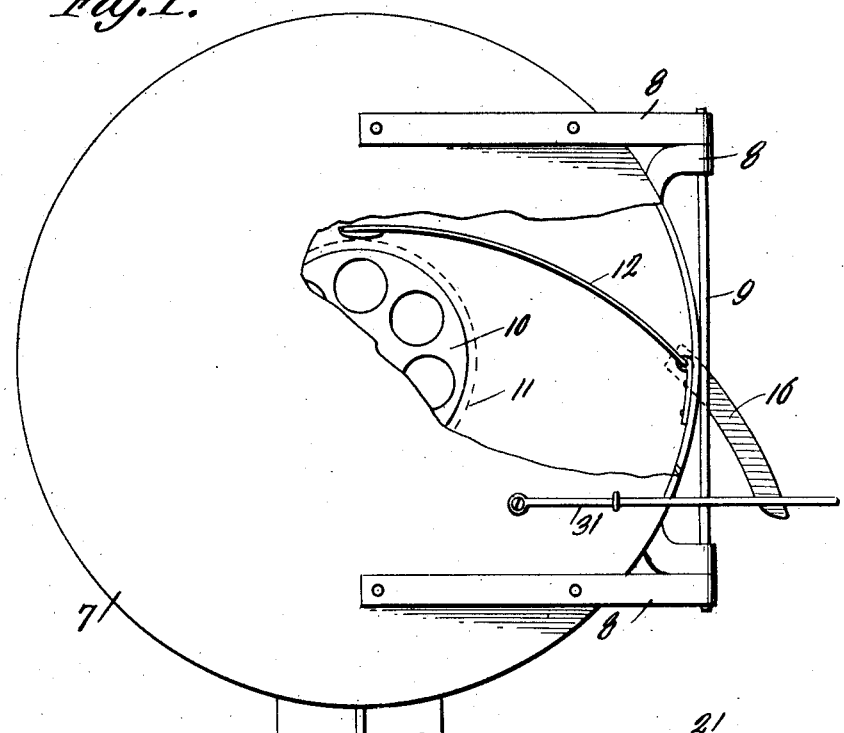
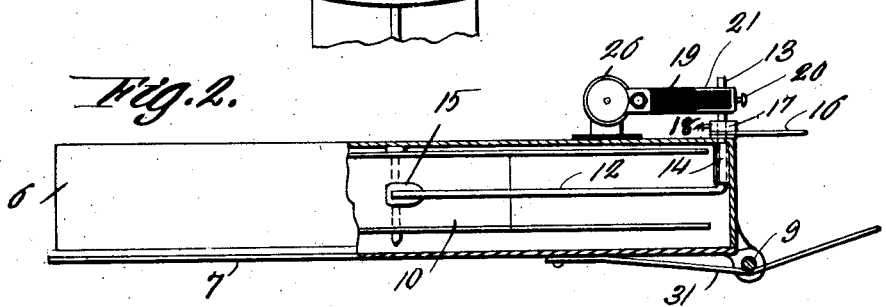
WITNESSES
Guy M Spring
B. F. Garvey
HARRY J. MUNSTER INVENTOR.
BY
Richard B Owen
ATTORNEY.

Jan. 1, 1924. 1,479,311
H. J. MUNSTER
SWITCH FOR MOTION PICTURE PROJECTORS
Filed Nov. 4, 1920 2 Sheets-Sheet 2
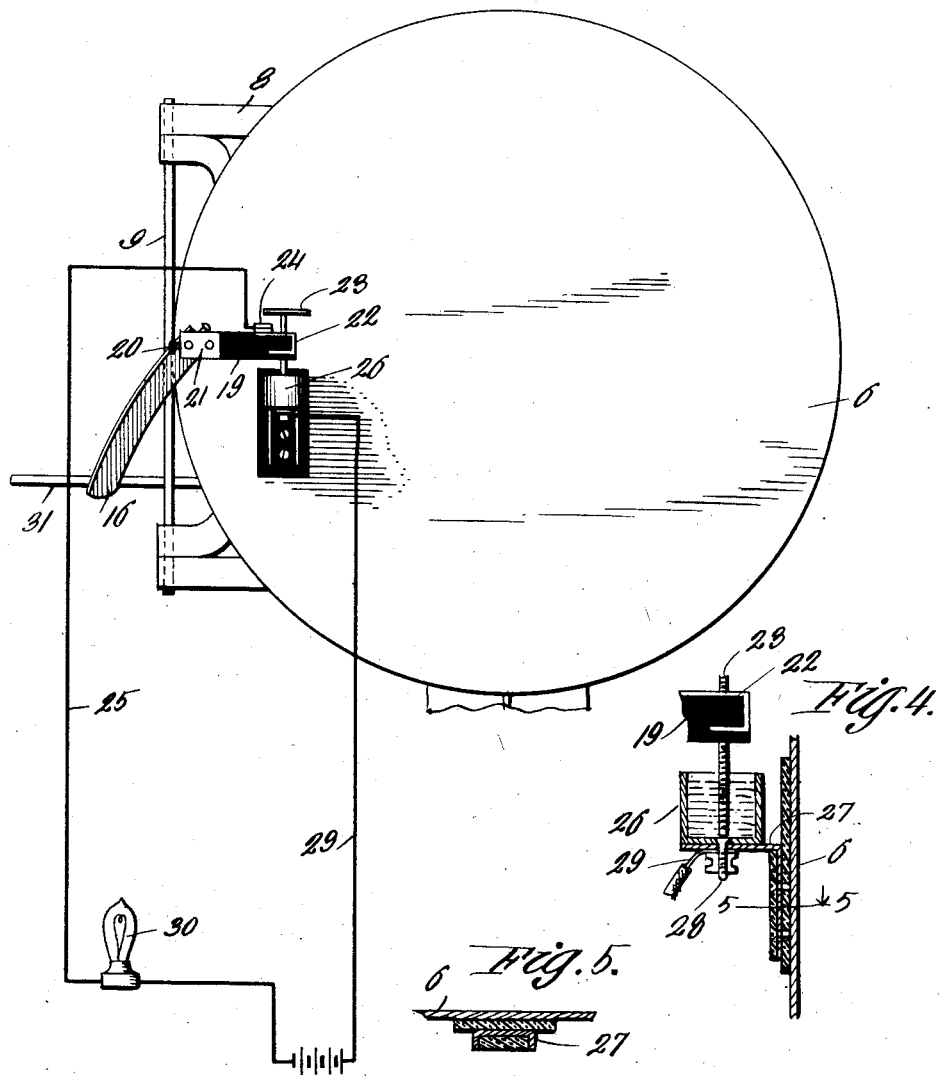
WITNESSES
Guy M Spring
B. J. Garvey
HARRY J. MUNSTER INVENTOR.
BY
Richard B Owen
ATTORNEY.

Patented Jan. 1, 1924.

1,479,311

UNITED STATES PATENT OFFICE.

HARRY J. MUNSTER, OF SAN DIEGO, CALIFORNIA.

SWITCH FOR MOTION-PICTURE PROJECTORS.

Application filed November 4, 1920. Serial No. 421,721.

*To all whom it may concern:*

Be it known that I, HARRY J. MUNSTER, a citizen of the United States, residing at San Diego, in the county of San Diego and State of California, have invented certain new and useful Improvements in a Switch for Motion-Picture Projectors, of which the following is a specification.

This invention relates to signals for motion picture projectors.

It is well known that in the use of motion picture projectors it is necessary to use at least two projectors for each theatre so as to give a continuous picture. This is usually done by initially displaying the first part of the picture carried by perhaps the first two thousand feet of the film on one reel, then transferring over to the other reel immediately upon the termination of the film on the first reel. Consequently, it is necessary that the operator keep a close watch on the first reel as the film is being removed therefrom so that there will be no break in transferring from one reel to the other. Consequently, it is a primary object of this invention to provide means for giving a signal when a certain amount of the film is removed from the reel.

Another object is to provide mechanism automatically operable upon the opening of the door of the film magazine to permit convenient entry and removal of the reel.

The above and other objects of this invention will be in part described and in part understood from the following description of the present preferred embodiment of the invention taken in connection with the accompanying drawings, wherein:

Fig. 1, is a side elevational view of a projector magazine constructed in accordance with my invention, a portion thereof being broken away to disclose details.

Fig. 2, is a top plan view of the same.

Fig. 3, is a side elevational view of the magazine looking at the side opposite from that shown in Fig. 1.

Fig. 4, is a detail fragmentary sectional view of the device showing especially the contact members and manner in which they are associated with the reel magazine, and Fig. 5, is a sectional view taken on the line 5—5 of Fig. 4, and looking in the direction of the arrow.

In the drawings, a reel magazine 6 is provided which may be of the usual or any desired configuration. A door 7 is hingedly mounted on one side of the magazine, being connected to the body by straps 8 which are pivotally engaged with a pintle 9. Mounted within the magazine is a reel 10 which may also be of the usual or any desired configuration, and is adapted to receive a film as indicated by the dotted line 11 in Fig. 1.

My invention consists especially of a contact arm 12, one end 13 of which is turned at right angles, pivotally mounted in a strap 14 and extended through the rear face of the magazine as shown to advantage in Fig. 2. The arm is preferably of an arcuate configuration and is provided with a shoe 15 on its inner end, which is adapted for engagement with the film 11. If desired a roller may be used instead of the shoe 15.

Mounted on the portion 13 of the arm 12 is an abutment 16, which in this instance comprises a finger which is slightly arcuate and is equipped with a bearing sleeve 17, the latter being secured to the outer face of the finger as shown to advantage in Fig. 2. The bearing is held fixed on the member 13 by a set-screw 18.

The said portion 13 of the arm 12 likewise carries an insulation block 19, the latter being held on the member 13 by a set-screw 20. It will be noted that the set-screw 20 extends through a conductive casing 21, which is arranged over the outer end of said block. A conductive strap 22 is arranged over the inner end of said block and has arranged therethrough an adjustable contact screw 23 as shown in Figure 3. A contact 24 is mounted on top of the conductive strap 22 and is engaged by one terminal of a circuit wire 25.

Mounted upon the rear face of the magazine 6 and suitably insulated therefrom is a cup 26 made of brass or any other suitable conductive material. A shelf 27 as shown in Figure 4 extends outwardly from said magazine to support the cup and is held from displacement by suitable securing means. The cup is detachably engaged to the shelf by a bolt 28, the latter extending through the bottom of the cup so as to likewise capacitate as a contact screw to be engaged by the contact screw 23 in a manner shown to advantage in Fig. 4. The screw 28 is engaged by a circuit wire 29, the latter being in circuit with the wire 25. The said circuit wires 25 and 29 extend to a suitable source of energy and are equipped with a suitable signal means, which in this instance consists of a lamp 30.

It is understood that as the film is unwound from its reel, the contact arm 12 will be vibrated due to the eccentricity of the film on the reel, thereby initially causing the lamp 30 to emit periodical flashes caused by making and breaking the circuit through the contact bolt 23. It is, of course, understood that the latter is permitted to gravitate into the cup 26 by the gravitation of the inner end of arm 12, which takes place during the unwinding of the film. Of course, after a predetermined portion of the film has been removed from the reel the circuit will be permanently closed so as to keep the lamp lighted. The initial flashes, however, warn the operator that the film is nearing the end and give him an opportunity to prepare the second reel for use. The cup 26 is filled with oil to prevent forming an arc when the contact is made. To permit removal of the film from the magazine, or the insertion of a reel therein, suitable automatic means is provided which consists of a trip 31 mounted on the door of the magazine and extended therebeyond as shown to advantage in Fig. 2. The trip is flexed over the pintle 9, whereby when the door is opened the free end of the trip will contact with the abutment 16, causing the latter to be operated downwardly through the arc of a circle, which simultaneously rotates the end 13 of the arm 12 and causes the latter to be elevated in the magazine. Of course, closing of the door immediately resets the arm 12.

It is to be understood that any kind of signalling means may be used instead of the lamp 30 if so desired. Also, various other changes may be made in this device without departing from the spirit and scope of my invention as covered by the appended claim.

What is claimed is:

A device of the character described including a casing equipped with an arm pivotally mounted in the casing and having one end thereof projected through the latter, an insulated block adjustably mounted on the projected end of said arm a contact screw adjustably mounted in said block, and a contact for cooperation with said screw consisting of an oil containing cup mounted on the side of said casing.

In testimony whereof I affix my signature in presence of two witnesses.

HARRY J. MUNSTER.

Witnesses:
F. M. GREEN,
CARL C. KALAND.